United States Patent
Milliron et al.

(10) Patent No.: US 9,569,875 B1
(45) Date of Patent: Feb. 14, 2017

(54) ORDERED LIST MANAGEMENT

(75) Inventors: Timothy S. Milliron, Menlo Park, CA (US); Sudeep Rangaswamy, San Francisco, CA (US); Brad Andalman, Oakland, CA (US); Michael Ferris, Sunnyvale, CA (US)

(73) Assignee: Pixar, Emeryville, CA (US)

( * ) Notice: Subject to any disclaimer, the term of this patent is extended or adjusted under 35 U.S.C. 154(b) by 2356 days.

(21) Appl. No.: 12/195,610

(22) Filed: Aug. 21, 2008

(51) Int. Cl.
   *G06T 19/20* (2011.01)
   *G06F 17/30* (2006.01)
   *G06T 13/00* (2011.01)

(52) U.S. Cl.
   CPC ......... *G06T 13/00* (2013.01); *G06F 17/30545* (2013.01); *G06F 17/30548* (2013.01); *G06T 19/20* (2013.01); *G06T 2210/61* (2013.01)

(58) Field of Classification Search
   CPC . H04N 21/854; H04N 21/2743; G06F 3/0481; G06F 3/0485; G06F 3/04847; G06T 13/20; G06T 13/80
   See application file for complete search history.

(56) References Cited

U.S. PATENT DOCUMENTS

| | | | |
|---|---|---|---|
| 6,552,723 B1* | 4/2003 | Duluk et al. | 345/419 |
| 2002/0032697 A1* | 3/2002 | French et al. | 707/500.1 |
| 2004/0056908 A1* | 3/2004 | Bjornson et al. | 345/968 |
| 2005/0248564 A1* | 11/2005 | Grassia | G06T 13/00 345/419 |

* cited by examiner

*Primary Examiner* — Jacinta M Crawford
*Assistant Examiner* — Diane Wills
(74) *Attorney, Agent, or Firm* — Patterson + Sheridan LLP

(57) ABSTRACT

Unordered list operations are used to create and modify ordered lists of components. Each list operation specifies an intention to change some aspect of an ordered list, such as the addition or removal of components or a change in the sequence of components. List operations are associated with intrinsic and extrinsic time-independent attributes. Multiple users can collaborate on an ordered list by specifying their own list operations. List operations are cumulative and do not destructively overwrite list operations from previous pipeline activities. An embodiment of the invention interprets list operations in a time independent manner using intrinsic and extrinsic list operation attributes. Because list operations are processed in a time-independent manner, multiple users may collaborate in any order on the creation of an ordered list, including simultaneously editing the ordered list, and still obtain consistent results.

17 Claims, 8 Drawing Sheets

LIST REMOVE OPERATION

LIST SORT HINT OPERATION

ORDERED LIST MANAGEMENT

BACKGROUND

The present invention relates to the field of computer graphics, and in particular to methods and apparatus for creating, modifying, and using components to create computer graphics productions. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

Computer graphics images, animations, and other productions involving computer graphics, such as interactive entertainment software, are created from a number of different components. Generally, components include any data and instructions used to create products and applications that include computer graphics. Examples of components include three-dimensional models of geometry; texture maps, other arrays of data, lighting, and shading programs used to determine the visual appearance of models; and simulation programs and data, animation data, and deformer functions used to specify changes and motion over time.

Components often have complex dependencies with other components. For example, the output of one component may be the input of one or more other components. Additionally, a set of components may have to be processed or executed in a specific order to achieve a desired result. Changing the order of processing or execution of components may change the result or introduce errors.

Ordered lists are one technique for specifying relationships and/or dependencies between components. An ordered list specifies a set of related components and their ordering or sequence. Ordered lists may be used to specify an evaluation order for components, an execution order for components, a dataflow relationship between components, or any other use of a specific sequence of components.

Computer graphics components are often created by users working in a digital production pipeline. Digital production pipelines include a number of different pipeline activities. In each pipeline activity, users may create new components, modify previously created components, and combine components created in one or more pipeline activity.

For large digital productions, such as in an animation or interactive digital production studio, it is often necessary for multiple people to be working on different activities of the digital production pipeline at the same time. Often, different people will be working on the same or related components at the same time. Some components may be created out of order to maximize user productivity. Additionally, the components of a completed scene may sent back into the digital production pipeline to create variations of components, which may be used to create and evaluate different creative interpretations of a scene. A pipeline activity may modify a component many times to create numerous variations of the component.

Prior digital production pipelines limit user collaboration and out of order creation and modification of components. For example, version control techniques maintain a strictly linear pipeline workflow. As components progress through activities in the digital production pipeline, changes to components replace or overwrite the previous state of the components. Because of this, it is possible to make potentially destructive modifications to any data that was authored at previous stages in the pipeline. It is difficult or impossible to go back to one previous stage of the digital production pipeline and create variations without discarding all of the data created following that previous stage. It is also typically difficult or impossible to return to an earlier point in the workflow to make changes and still have unaffected "downstream" changes apply.

These problems are especially acute when dealing with the creation and modification of ordered lists. In prior systems, an ordered list of components may be initially defined in a first pipeline activity. If this ordered list needs to be modified in later pipeline activity, for example by adding components, a new ordered list has to specified, overwriting the previously-defined ordered list. If the first pipeline activity later modifies its components, yet another new ordered list must be specified. This process is complicated and error-prone, as this newest ordered list must include components that are defined by later pipeline stages.

There is an unmet need for a system and method to enable collaboration, iterative refinement, and variations of ordered lists of components in digital production pipelines. It is further desirable for the system and method to enable modification of ordered lists of components at any point of the production pipeline and in any order without disrupting work upstream or downstream in the pipeline.

BRIEF SUMMARY

An embodiment of the invention creates and modifies ordered lists of components using list operations. A list operation specifies an intention to change some aspect of an ordered list, such as the addition or removal of components or a change in the sequence of components. List operations are evaluated in a time independent manner based on intrinsic and extrinsic attributes to define one or more ordered lists of components. A list operation does not explicitly define a complete ordered list. Instead, an embodiment of the invention evaluates list operations specified within all or a portion of a production to determine a complete ordered list.

Multiple users can collaborate on the creation and modification of an ordered list by specifying their own list operations. List operations defining portions of an ordered list may be defined or modified at point of a digital production pipeline or by any data or digital asset in a production. List operations are cumulative and do not destructively overwrite list operations from previous pipeline activities. Furthermore, list operations allow an ordered list to be changed by early pipeline activities without discarding all of the data created following that previous stage, allowing any unaffected "downstream" changes to still apply to the ordered lists.

An embodiment of the invention interprets list operations in a time independent manner. Regardless of the sequence or time that list operations are created or received for processing, an embodiment of the invention will produce the same resulting ordered list for a given set of list operations. Because list operations are processed independently of their time of creation or receipt, a set of list operations may be referred to as an unordered set of list operations. Because list operations are processed in a time-independent manner, multiple users may collaborate in any order on the creation of an ordered list, including simultaneously editing the ordered list, and still obtain consistent results.

In an embodiment, list operations may be processed in an order specified by intrinsic or extrinsic time-independent criteria. Examples of intrinsic time-independent criteria include a user identity, a user type, a user role, a digital production pipeline activity associated with the user specifying a list operation, and/or any combination thereof. Examples of extrinsic time-independent criteria include layer data structures and/or layer stacking orders, container data structures, graph or network data structures, any other type of data or data structure referencing one or more list operations, and/or any combination thereof.

BRIEF DESCRIPTION OF THE DRAWINGS

The invention is described with reference to the drawings, in which.

DETAILED DESCRIPTION OF THE INVENTION

An embodiment of the invention creates and modifies ordered lists of components using list operations. A list operation specifies an intention to change some aspect of an ordered list, such as the addition or removal of components or a change in the sequence of components. List operations are evaluated in a time independent manner based on intrinsic and extrinsic attributes to define one or more ordered lists of components. A list operation does not explicitly define a complete ordered list. Instead, an embodiment of the invention evaluates list operations specified within all or a portion of a production to determine a complete ordered list.

Multiple users can collaborate on the creation and modification of an ordered list by specifying their own list operations. List operations may be received asynchronously and/or in parallel from multiple users. List operations defining portions of an ordered list may be defined or modified at point of a digital production pipeline or by any data or digital asset in a production. List operations are cumulative and do not destructively overwrite list operations from previous pipeline activities. Furthermore, list operations allow an ordered list to be changed by early pipeline activities without discarding all of the data created following that previous stage, allowing any unaffected "downstream" changes to still apply to the ordered lists.

An embodiment of the invention interprets list operations in a time independent manner. Regardless of the sequence or time that list operations are created or received for processing, an embodiment of the invention will produce the same resulting ordered list for a given set of list operations. Because list operations are processed independently of their time of creation or receipt, a set of list operations may be referred to as an unordered set of list operations. Because list operations are processed in a time-independent manner, multiple users may collaborate in any order on the creation of an ordered list, including simultaneously editing the ordered list, and still obtain consistent results.

In an embodiment, list operations may be processed in an order specified by intrinsic or extrinsic time-independent criteria. Examples of intrinsic time-independent criteria include a user identity, a user type, a user role, a digital production pipeline activity associated with the user specifying a list operation, and/or any combination thereof. Examples of extrinsic time-independent criteria include layer data structures and/or layer stacking orders, container data structures, graph or network data structures, any other type of data or data structure referencing one or more list operations, and/or any combination thereof.

Figure 1A:
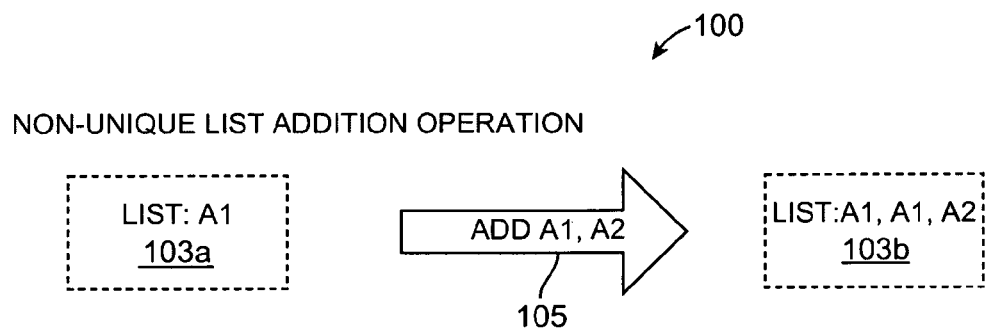
FIGS. 1A-1D illustrate example list operations according to an embodiment of the invention.

FIGS. 1A-1D illustrate example list operations according to an embodiment of the invention. FIG. 1A illustrates an example 100 of a non-unique list addition operation 105. Non-unique list addition operation 105 adds one or more components to an ordered list. In an embodiment, non-unique list addition operation adds components to a default location in an ordered list, for example appending components to the end of the ordered list or prepending components to the beginning of the ordered list. Non-unique list addition operation 105 allows multiple instances of a component to exist within an ordered list. For example, a component implementing a filter or function may be need to be applied to data multiple times.

In an example 100, list 103a initially includes component A1. List operation 105 adds components A1 and A2 to list 103a, resulting in ordered list 103b, which includes components A1, A1, and A2. In example 100, components A1 and A2 are appended to the end of the ordered list 103a to form ordered list 103b. Although the list 103a includes a first instance of component A1, a second instance of component A1 is added to the list 103b because of non-unique list addition operation 105.

Figure 1B:
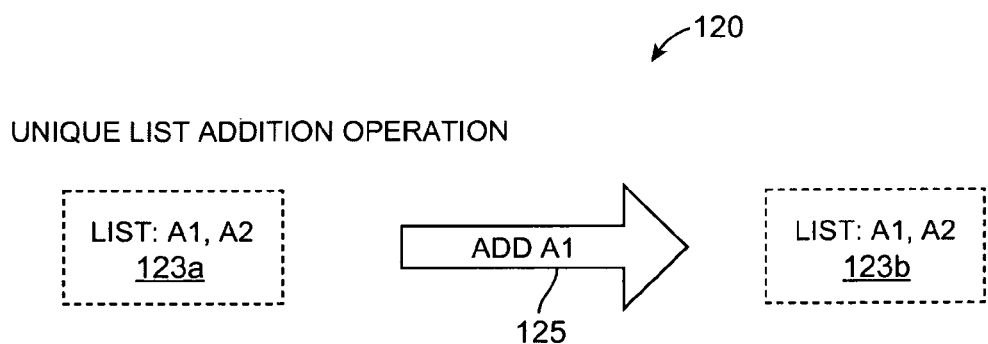

FIG. 1B illustrates an example 120 of a unique list addition operation 125. Unique list addition operation 125 adds one or more components to an ordered list only if these components are not already in the list. If a component specified by the unique list addition operation 125 is already included in the ordered list, then this list operation 125 does not add an additional instance of this component to the ordered list. As described above, an embodiment of unique list addition operation 125 adds components to a default location in an ordered list, for example appending components to the end of the ordered list or prepending components to the beginning of the ordered list.

In an example 120, list 123a initially includes components A1 and a2. Unique list addition operation 125 attempts to add component A1 to list 123a. However, because component A1 is already included in the list 123a, the resulting ordered list 123b is the same as ordered list 123a.

Figure 1C:
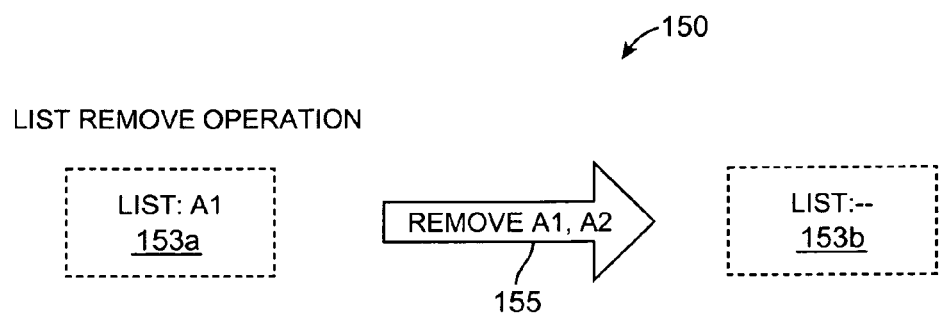

FIG. 1C illustrates an example 150 of a list removal operation 155 according to an embodiment of the invention. A list removal operation removes one or more components from an ordered list. In an embodiment, no error will result if a list removal operation specifies removing a component that is not included in an ordered list. In this example, ordered list 153a initially includes component A1. List removal operation 155 specifies the removal of components A1 and A2 from the ordered list 153a, resulting in an empty ordered list 153b. In one embodiment, a list removal operation will remove all instances of a component from a list of the list includes multiple instances of a component. In another embodiment, a list removal operation will remove only a portion of the multiple instances of a component from a list including multiple instances of a component.

Figure 1D:
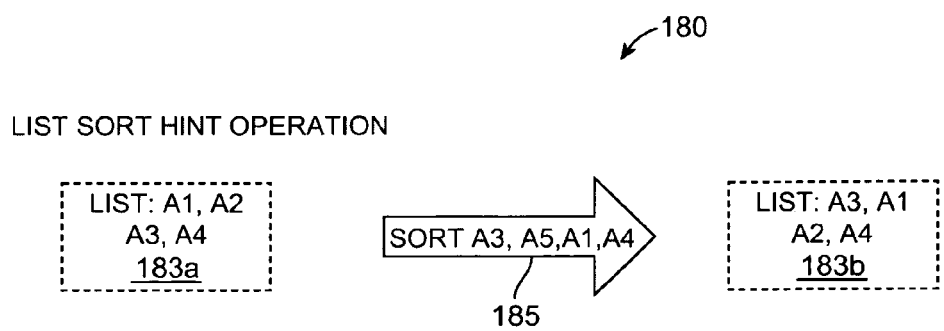

Besides adding and removing components from ordered lists, an embodiment of the invention includes list operations that specify all or a portion of the sequence or order of components within an ordered list. FIG. 1D illustrates an example 180 of a list sorting operation 185 according to an embodiment of the invention. List sorting operations can specify the sequence of components within an ordered list in a number of different ways. In one embodiment, a list sorting operation can provide an explicit ordering of components. In another embodiment, a list sorting operation can provide a sorting criteria used to arrange components based on their attributes. In still another embodiment, a list sorting operation may specify list insertion criteria that indicates a location within a list to add specific components.

In yet another embodiment, a list sorting operation specifies a list sorting hint, which indicates a relative order for two or more components, but does not necessarily specify the absolute order of all of the components within an ordered list. Example 180 includes a list sorting operation 185 specifying a list sorting hint of "A3, A5, A1, A4." In this example, the list sorting hint specifies a relative ordering of component A3 before component A5, component A5 before component A1, and component A1 before component A4.

Given an initial ordered list 183a including a sequence of components A1, A2, A3, and A4, list sorting operation 185 will result in ordered list 183b including the sequence of components A3, A1, A2, and A4. This sequence of components in ordered list 183b is created by first moving component A3 in list 103a to the nearest list position in front of component A1, as specified by the list sorting operation. In this example, component A3 is moved to the front of the list, directly before component A1. List 103a does not include a component A5, so this portion of the list sorting operation 185 is ignored. List sorting operation 185 also specified that component A1 is before component A4. In list 103a, component A1 is already before component A4, so further change is necessary. List sorting operation 185 does not specify any location for component A2, so component A2 is unaffected.

Additionally, list operations may be directed to one or more specific ordered lists. This allows list operations to create and modify any number of independent ordered lists. In a further embodiment, if a list operation is directed to a specific ordered list that has not already been created or initialized, the application processing the list operation will automatically create this ordered list and perform the list operation. In an alternate embodiment, if a list operation is directed to a specific ordered list that has not already been created or initialized, the application will ignore this list operation.

Embodiments of the invention may include other list operations, such as compound operations that combine adding, removing, and sorting components. Embodiments of the invention may include conditional list operations, which perform some operation only if a specified condition within a list or outside of a list is satisfied.

Figure 2A:
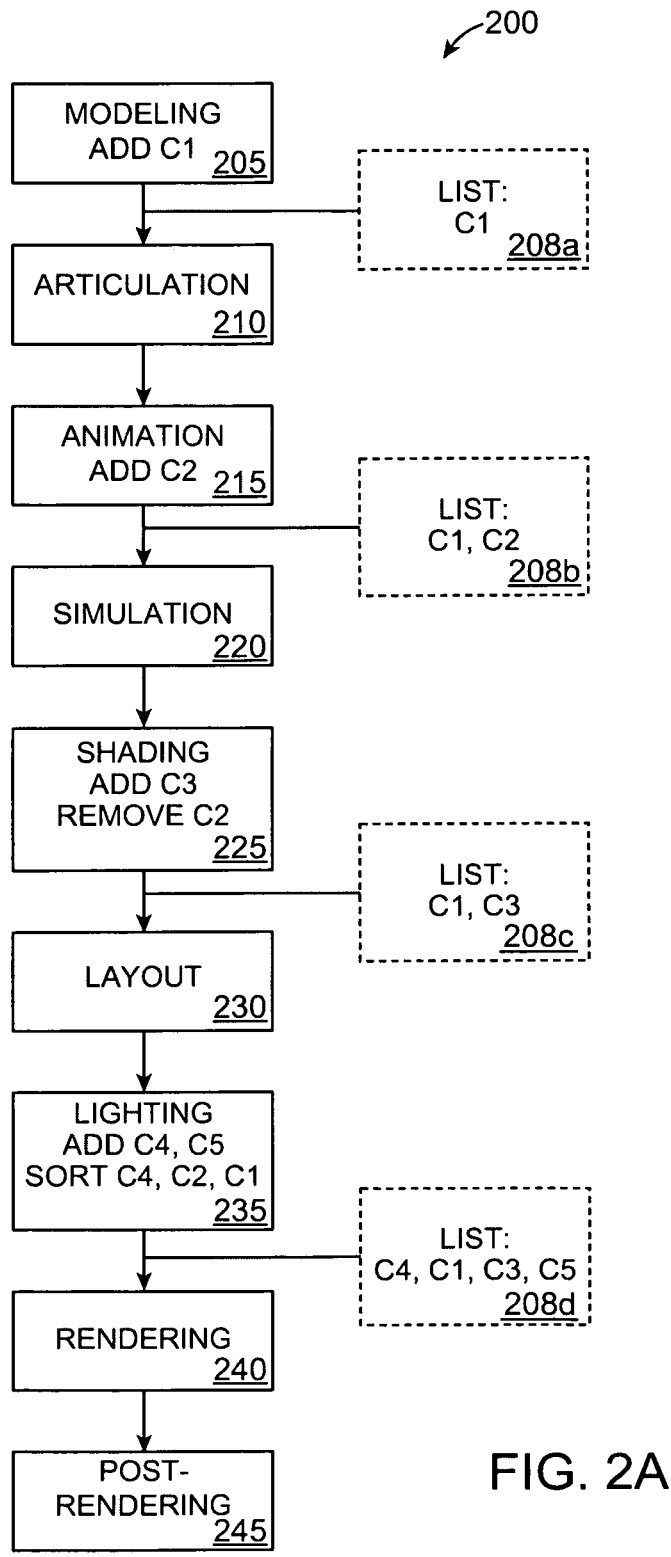
FIGS. 2A-2B illustrates example applications of list operations in digital production pipelines according to an embodiment of the invention.
Figure 2B:
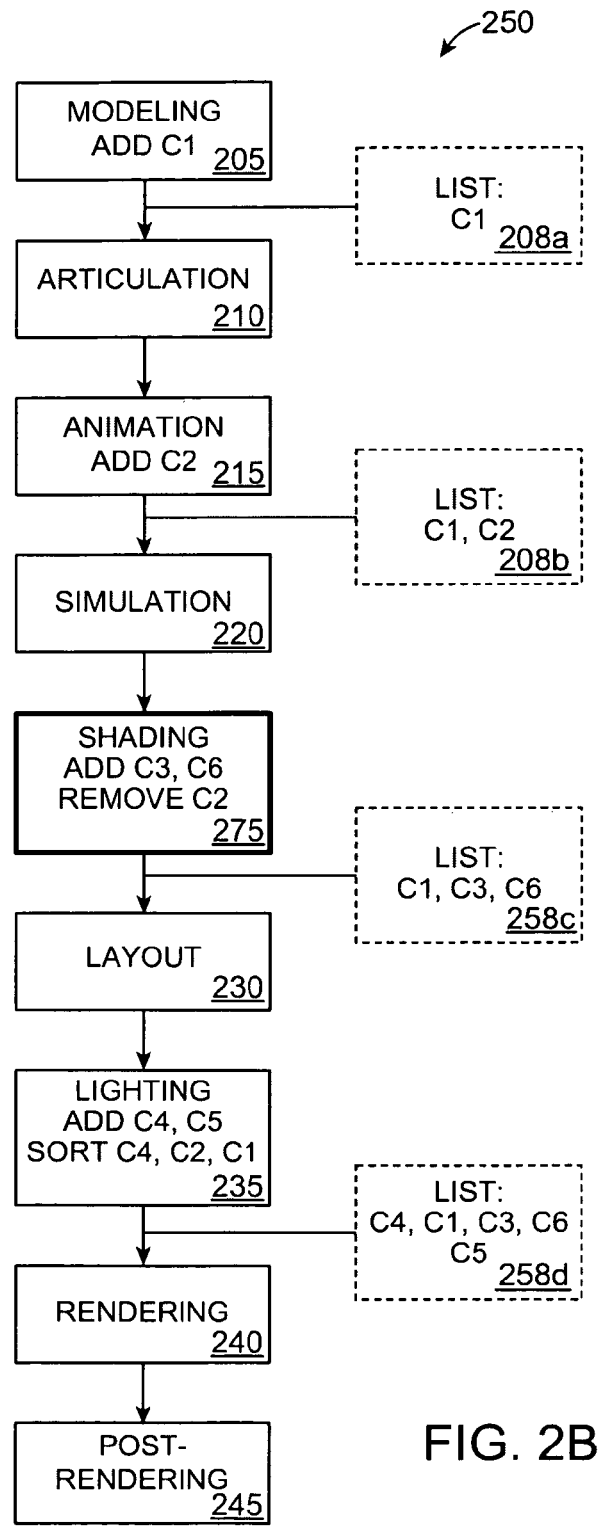

Embodiments of the invention may use list operations to specify ordered lists of components (or of attributes within components) in many different applications. FIGS. 2A-2B illustrates example applications of list operations in digital production pipelines according to an embodiment of the invention. FIG. 2A illustrates a usage of list operations in an example digital production pipeline 200 according to an embodiment of the invention.

Example digital production pipeline 200 includes modeling activities 205, articulation activities 210, animation activities 215, simulation activities 220, shading activities 225, layout activities 230, lighting activities 235, rendering activities 240, and post-rendering activities 245. These activities of digital production pipeline 200 are provided to illustrate an example of typical digital production pipeline activities and are not intended to limit the scope of list operation applications; embodiments of list operations may be used in digital production pipelines with any type and number of activities.

In this example, modeling activity 205 includes a list addition operation "Add C1." Thus, after modeling activity 205, ordered list 208a includes component C1. Animation activity 215 includes a list addition operation "Add C2." If digital production software evaluates all of the list operations in pipeline activities 205, 210, and 215, the resulting ordered list 208b will include components C1 and C2.

Shading activity 225 includes the list addition operation "Add C3" and the list removal operation "Remove C2." Assuming the shading activity 225 follows animation activity 215, as shown in example digital production pipeline 200, the resulting ordered list 208c will include components C1 and C3.

Lighting activity 235 includes the list addition operation "Add C4, C5" and the list sorting hint operation "Sort C4, C2, C1." The ordered list 208d, resulting from the list operations of pipeline activities 205 through 235, includes the sequence of components C4, C1, C3, and C5.

As shown in example 200, the contents of an ordered list depends on the list operations evaluated. For example, a user or application can direct a digital production pipeline application to evaluate list operations from the entire digital production pipeline; from a selected portion of the digital production pipeline, such as the current pipeline activity and any preceding pipeline activity; or any other subset of list operations specified in a digital production pipeline, such as list operations associated with a specific attribute or matching a given criteria.

Furthermore, because list operations are cumulative, changes in an ordered list in one pipeline activity do not destructively overwrite list operations from previous pipeline activities or interfere with list operations specified in later pipeline activities. For example, the list removal operation "Remove C2" in shading activity 225 overrides the list addition operation "Add C2" in animation activity 215. However, this override is non-destructive and if this list removal operation in shading activity 225 is later deleted, component C2 will automatically be included in the ordered lists 208c, 208d, and any other ordered lists generated from list operations of example digital production pipeline 200 without any user intervention.

Additionally, specifying ordered lists using list operations allows ordered lists to be modified without discarding all of the data created following that previous stage, allowing any unaffected "downstream" changes to still apply to the ordered lists. Moreover, a user or application does not need a complete specification of an ordered list to modify the ordered list. A user or application can specify list operations adding, removing, or sorting components of an ordered list without knowing which components are included in the ordered list. This reduces the complexity required to collaborate on ordered lists, as a user or application can specify a "contribution" to an ordered list without needing to know about other users or applications' previous or future contributions to the ordered list. Additionally, this reduces the time and computational resources required to manipulate ordered lists, as applications do not need to determine the complete contents of an ordered list before specifying list operations.

FIG. 2B illustrates a further example usage of list operations in an example digital production pipeline 250 according to an embodiment of the invention. Example digital production pipeline 250 illustrates how modifications to the ordered list are specified at various pipeline activities and automatically update the ordered list without affecting the previously authored portions of the ordered. Digital production pipeline 250 is similar to digital production pipeline 200, with some of the list operations of example pipeline 200 modified.

In example 250, shading activity 275 has been modified from its counterpart 225 in the example pipeline 200 to includes the list addition operation "Add C1, C6." This modification of the list operation adds component C6 to ordered lists 258c and 258d. In this example 250, the modified list operation in shading activity 275 does not overwrite the previously specified list operations in activities 205, 215, and 235.

In a further application of list operations, an embodiment of the list operations may be expressed in a layers data structure suitable for use with digital production pipelines and other collaborative data creation applications. Layers data structures are described in detail in U.S. patent application Ser. No. 11/738,953, filed Apr. 23, 2007, and entitled "Layering and Referencing of Scene Description," which is incorporated by reference herein for all purposes.

Figure 3:
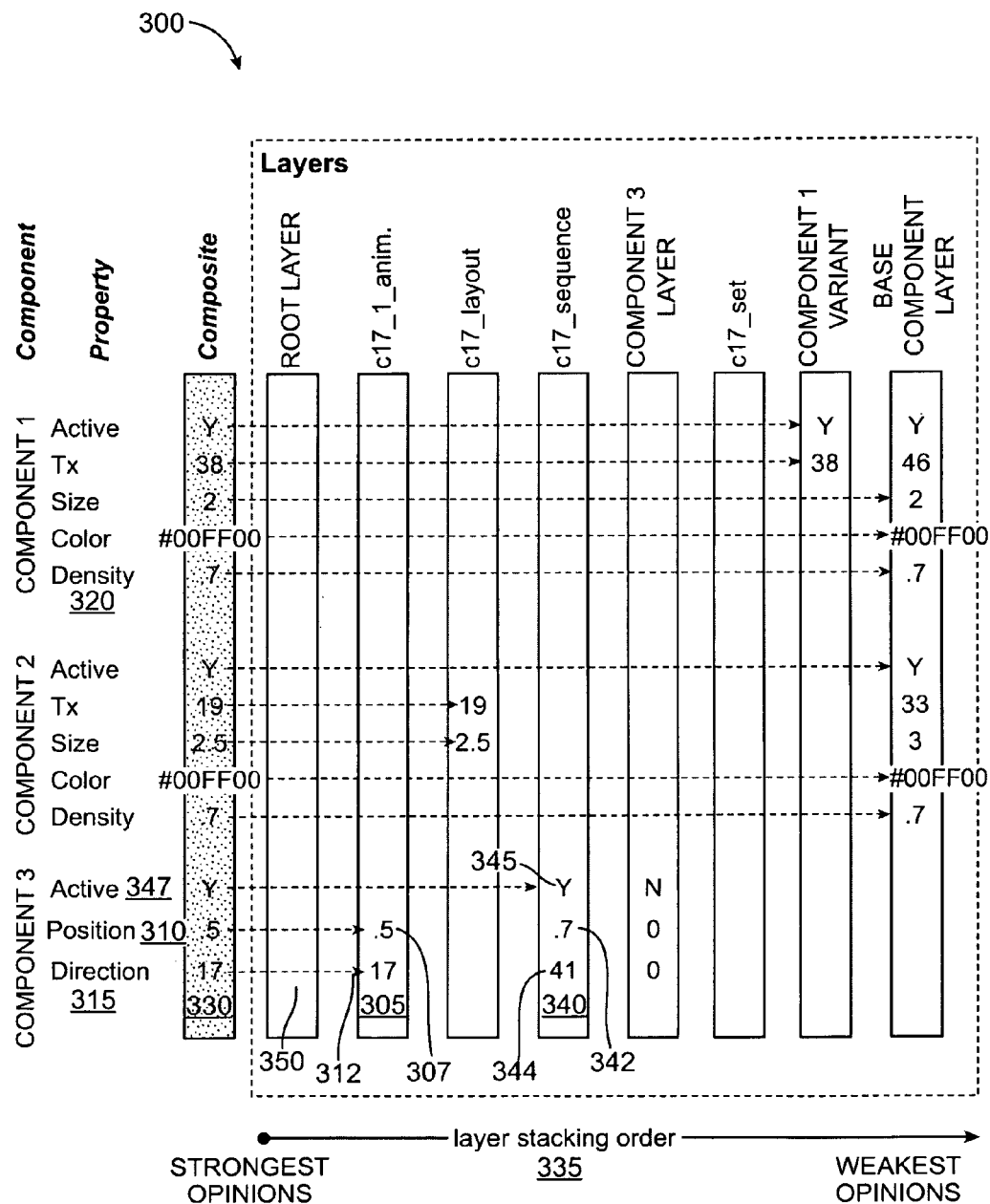
FIG. 3 illustrates an example layers data structure suitable for use with embodiments of the invention.

FIG. 3 illustrates an example layers data structure 300 suitable for use with embodiments of the invention. Layers data structure 300 specifies attributes of components in one or more scenes according to an embodiment of the invention. In an embodiment, a component in one or more scenes is represented using one or more layers of a layer data structure. The layer data structure stores opinions of attribute values for a component. In this embodiment, each non-empty layer is adapted to include an opinion of the value of at least one attribute of at least one component. As discussed in detail below, each layer can override opinions of attribute values from weaker or lower-level layers.

Each layer may be sparsely populated—that is, a layer does not have to include opinions for the value of every attribute of a component. Each layer can specify an opinion of value for a new attribute without having that attribute explicitly declared by a prior layer. A layer can include opinions of value for attributes of multiple components. Additionally, empty layers can be created in early stages of the digital production pipeline as placeholders for opinions of attribute values to be provided at later stages of the digital production pipeline.

In example layer data structure 300, layer 305 includes an opinion 307 that the position attribute 310 of component 3 should be set to a value of 0.5 and an opinion 312 that the direction attribute 315 of component 3 should be set to a value of 17. As can be seen in this example, the opinions of value of other attributes, such as the density attribute 320 of component 1, are undefined in layer 305.

In the above example, attribute values are numerical parameters. However, embodiments of layer data structure 300 allow the specification of any data type for an attribute value, including integers; floating point numbers; characters; strings; Boolean values; geometry data; compound data types such as vectors with two or more dimensions, matrices, structures, arrays, dictionaries, hash tables, elements of edit decision lists; references to one or more components; references to one or more layers; references to elements, tables, or other structures of a database; and references to internal or external functions, scripts, or executable programs.

Layers provide opinions of value for attributes of components in terms of the semantic structure associated with the components. Any arbitrary abstract attribute of a component can be expressed in a layer. Furthermore, one or more layers can provide opinions of value for the attribute of a component in the unique terms or semantic structure defined for that attribute. There is no need to reduce opinions of value of abstract attributes to a common or low-level form, such as pixels or points, to composite the values.

For example, a first layer can specify a model of a character wearing a hat. One attribute of the hat could be its type, such as "sombrero." Another attribute of the hat could be its color, such as "red." A third attribute of a hat could be its material, such as "straw." Thus, from the view of the first layer, the character model should have a red straw sombrero. A second layer that is higher or stronger than the first layer could change the type attribute of the hat from "sombrero" to "top hat." Thus, from the view of the second layer, the character model should have red straw top hat. A third layer that is higher or stronger than the second layer could specify that the color attribute of the hat should be "purple" and the material attribute should be "felt." Thus, from the view of the third layer, the character should have a purple felt top hat. In this example, each layer expresses an opinion of one or more attribute values in terms of the semantics associated with each attribute.

Furthermore, a component may include a cross-reference to another component defined by one or more layers. For example, a Hat component of a character model can be a cross-reference to a specific model of a hat. Thus, when cross-reference is set to a "sombrero" component, the character model includes a model of a sombrero. When the cross-reference is overridden by a layer to a "top hat" component, the character model is changed to include a model of a top hat. Each of these models can be defined by one or more layers, the attributes of which can be wholly or partially or overridden by other layers as described above.

In an embodiment, every activity in the digital production pipeline is associated with one or more layers. Users can create and manipulate layers manually to provide additional control and ease of use for a component. For example, the attributes of different models can be specified in separate layers. In another example, related attribute values for different models in a scene can be specified in the same layer to facilitate easy manipulation. In an embodiment, applications associated with activities can automatically create, access, and modify layers based on context, such as the activity, the type of component, and the action being performed by the user.

The complete authored state of one or more components in one or more scenes at a given point of the digital production pipeline is determined by compositing all of the layers associated with a given point to produce a composite layer 330. The composite layer 330 includes opinions of attribute values for the attributes specified by one or more of the associated layers. The composite layer 330 can also be referred to as a composite scene description.

In an embodiment, a layer stacking order 335 determines the order in which layers are composited. This in turn specifies how attribute values in one layer override corresponding attribute values in other layers. In an embodiment, layers are assigned a strength in absolute or relative terms. For example, a first layer can include a relative strength value indicating that it is stronger than or weaker than one or more other layers. In this embodiment, opinions of attribute values in stronger layers will be at the "top" of the stacking order and will override opinions of attribute values in weaker layers, i.e. layers that are "lower" in the stacking order. The example layer stacking order 335 is a linear order; however, more complicated layer stacking orders with multiple branches can be utilized. In an embodiment, layer stacking orders can be set or modified by digital production pipeline applications, either manually by a user or automatically by applications. In a further embodiment, the strength of layers is defined at least in part with respect to a root layer, such as root layer 350, which is by default the strongest or highest level layer.

In example layer data structure 300, layer 340 includes opinions 342 and 344 of the value of attributes 310 and 315. However, stacking order 335 places layer 305 as stronger than, or ahead of, layer 340. Thus, in the composite layer 330, the opinions of value 307 and 312 of layer 305 for attributes 310 and 315 will override corresponding opinions 342 and 344 in layer 340. However, as layer 305 does not define an opinion of value for attribute 347 of component 3, the opinion 345 in layer 340 will define the value of attribute 347 in the composite layer 330.

Figure 4:
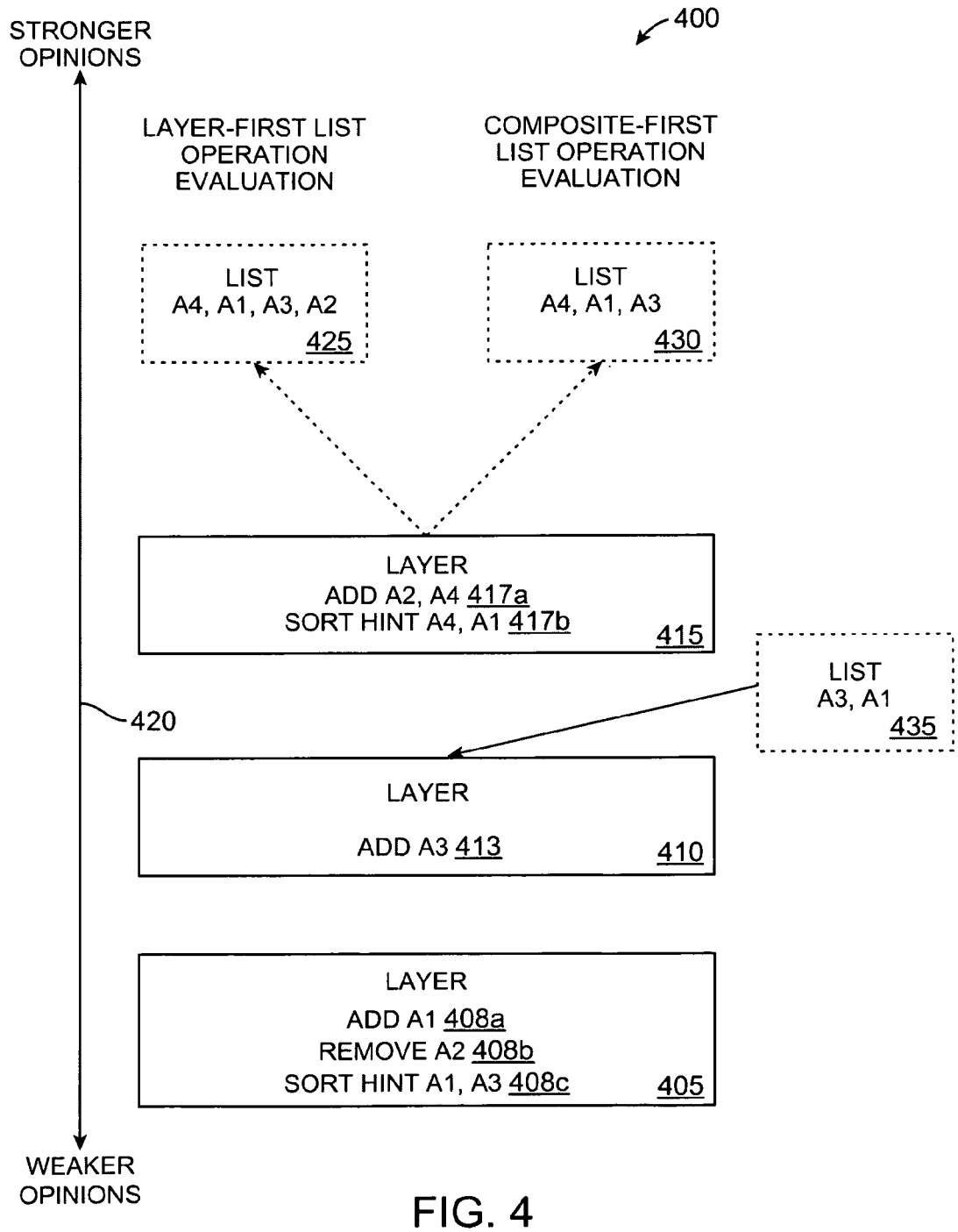
FIG. 4 illustrates an example application of list operations using a layers data structure according to an embodiment of the invention.

FIG. 4 illustrates an example application of list operations using a layers data structure 400 according to an embodiment of the invention. Layers data structure 400 includes layers 405, 410, and 415 arranged according to layer stacking order 420, with layer 405 being the weakest layer and layer 415 being the strongest layer.

In this example, each layer of the layer data structure 400, in addition to potentially including opinions of value of attributes of components, may also include one or more list operations associated with one or more ordered lists. For example, layer 405 includes list operations 408, layer 410 includes list operation 413, and layer 415 includes list operations 417. In this example, list operations 413 and 417 express their layers' intention to create or modify some aspect of an ordered list.

List operations expressed in a layers data structure operate similarly to the list operations described above. In an embodiment, the layer stacking order 420 specifies an evaluation order of the list operations within the layers data structure 400. List operations in the layers data structure 400 may be evaluated in a number of different ways. In a first embodiment, the list operations within a weaker layer are processed completely before processing list operations in the next stronger layer. This is referred to as a layer-first list operation evaluation. For example, list operations 408*a*, 408*b*, and 408*c* in layer 405 are processed first, followed by list operation 413 in layer 410, and then followed by list operations 417*a* and 417*b* in layer 415. This results in example ordered list 425.

In another embodiment, the list operations from multiple layers grouped together according to the layer stacking order 420 and then executed. This is referred to as composite-first list operation evaluation. For example, the list addition operations 408*a*, 413, and 417*a* are first executed, followed by list removal operation 408*b*, and then followed by list sorting operations 408*c* and 417*b*. This results in example ordered list 430.

Additionally, an embodiment of the invention may evaluate the list operations from only a selected portion of the layers of a layers data structure. Example ordered list 435 results from the evaluation of the list operations of layers 410 and 405 only. This embodiment may be used when only a portion of the layers include data relevant to an application or activity.

In yet another application of list operations, an embodiment of list operations may be expressed within container data structures, such as intra-model dependency data structures. Intra-model data dependency data structures, also referred to a "hook sets," are described in detail in U.S. Pat. No. 7,330,185, entitled "Techniques for processing complex scenes," and U.S. Pat. No. 7,064,761, entitled "Techniques for animating complex scenes," which are incorporated by reference herein for all purposes.

Figure 5:
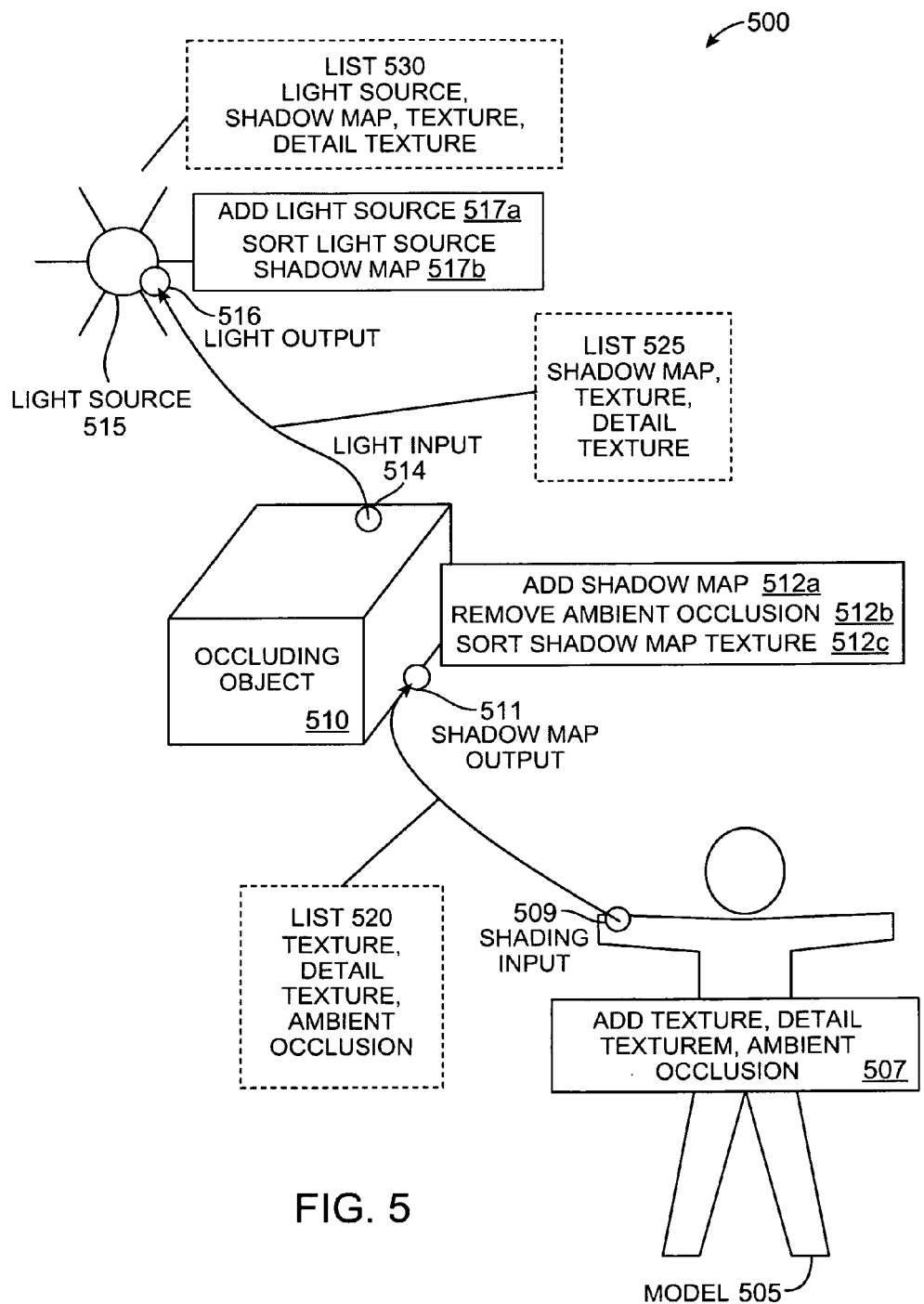
FIG. 5 illustrates an example application of list operations using intra-model dependency data structures according to an embodiment of the invention.

FIG. 5 illustrates an example application of list operations using intra-model dependency data structures according to an embodiment of the invention. Example scene 500 includes a components such as character model 505; occluding object 510 adapted to cast a shadow; and light source 515. In this example, the components 505, 510, and 515 are represented at least in part using intra-model dependency data structures, which specify the static dependency relationship between component data inputs and component data outputs.

For example, character model component 505 includes a shading data input 509 adapted to receive data about the scene used for shading the character model component 505, such as the amount of light received by the surface of the character model component 505. Similarly, occluding object component 510 includes a shadow map data output 511 adapted to specify the shadow cast by the occluding object component 510. The data from shadow map data output 511 of the occluding object component 510 is specified at least in part by the light received by the occluding object component 510 from a light source. The light received by the occluding object component 510 is specified by data received by the light input 514. The light source component 515 includes a light data output 516 adapted to provide light source data to components such as occluding object component 510 and character model component 505.

Example scene 500 specifies that the light source component 515 casts light on to character model component 505. This light is modulated by the shadow map associated with occluding object component 510. In an embodiment, the inter-model dependency relationships are specified using dynamic component dependency data structures, such as cue data structures, while the intra-model dependency data structures are specified using intra-model static dependency data structures such as hook sets.

In an embodiment, the intra-model dependency data structures associated with components include list operations. The inter-model dependency data defines an evaluation order for the list operations. By evaluating a set of inter- and intra-model dependencies, list operations are evaluated to create one or more ordered lists.

For example, model component 505 includes the list operation 507 "Add Texture, Detail Texture, Ambient Occlusion." Thus, model component 505 specifies ordered list 520 including the components Texture, Detail Texture, and Ambient Occlusion.

Similarly, occluding object component 510 applies the list operations 512 to the data associated with its shadow map output 511. Thus, occluding object component 510 adds a Shadow Map component, removes an Ambient Occlusion component, and sorts the Shadow Map component ahead of the Texture component in ordered list 520, resulting in ordered list 525 including components Shadow Map, Texture, and Detail Texture.

Light source component 515 applies the list operations 517 to the ordered list 525, adding the Light Source component to the ordered list before the Shadow Map. The resulting ordered list 530 includes the components Light Source, Shadow Map, Texture, and Detail Texture.

Figure 6:
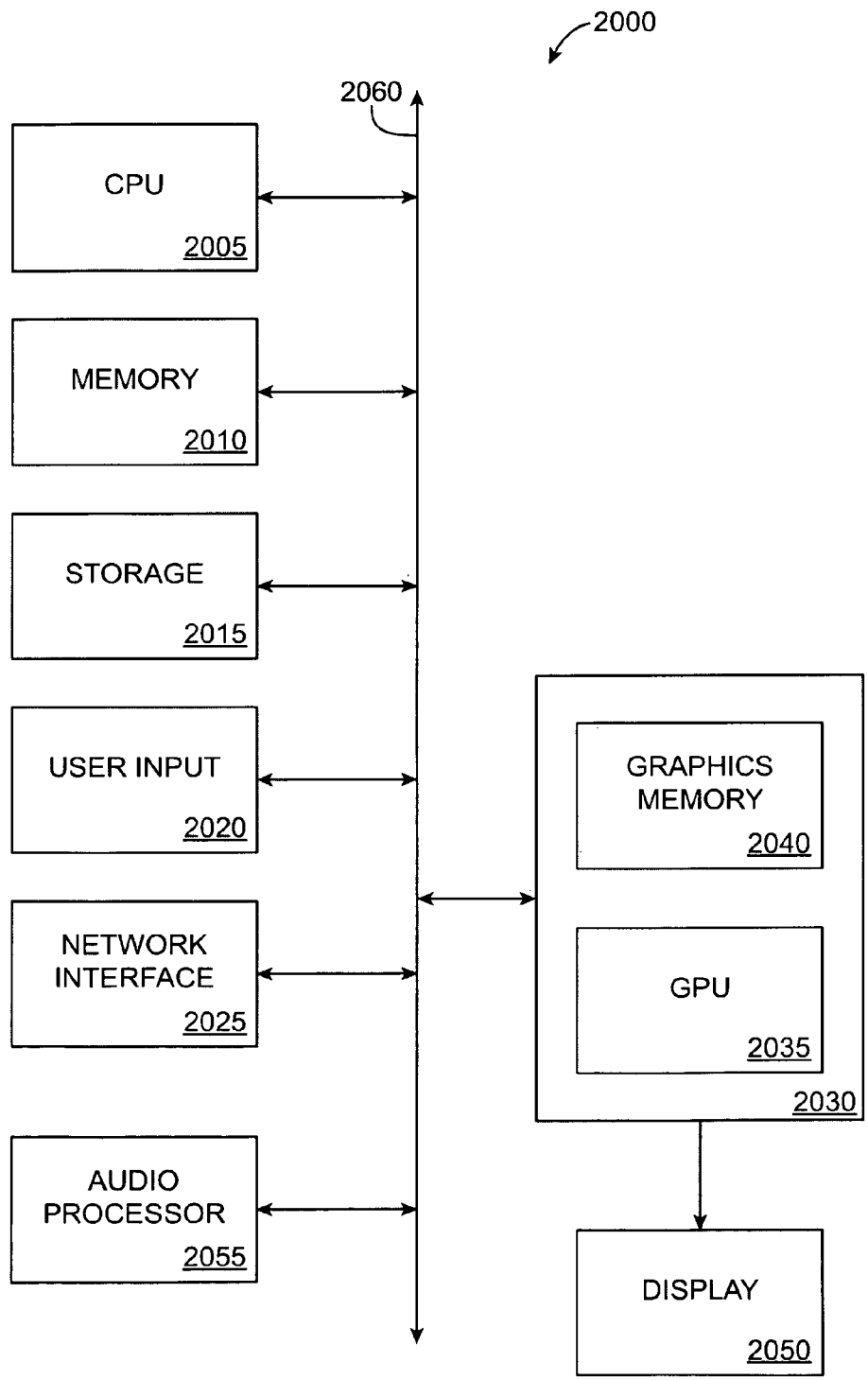
FIG. 6 illustrates a computer system suitable for implementing an embodiment of the invention.

FIG. 6 illustrates a computer system suitable for implementing an embodiment of the invention. FIG. 6 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, C P U 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into or replaced by CPU 2005.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of generating an ordered list of components, the method comprising:

receiving a set of list edit operations, wherein the set of list edit operations contains a plurality of list edit operations, and wherein each list edit operation in the set of list edit operations specifies a respective manipulation of the ordered list of components that includes at least one of (i) adding a component to the ordered list of components, (ii) removing one or more components in the ordered list of components, and (iii) re-ordering two or more of components in the ordered list of components;

determining one or more extrinsic attributes of the set of list edit operations, wherein the one or more extrinsic attributes specify at least one of (i) layers associated with the set of list edit operations and a layer stacking order, (ii) components including the set of list edit operations and component dependency data specifying relationships between the components, (iii) container data structures associated with the set of list edit operations and container dependency data, and (iv) graph data structures associated with the set of list edit operations and graph dependency data;

determining one or more intrinsic attributes of the set of list edit operations, wherein the one or more intrinsic attributes specify at least one of (i) a user identity, (ii) a user type, (iii) a user role, and (iv) a digital production pipeline activity, relating to at least one of the list edit operations in the set of list edit operations;

determining, by operation of one or more computer processors, an evaluation order of the set of list edit operations, based on the determined one or more intrinsic attributes and the determined one or more extrinsic attributes, wherein the evaluation order is independent of an ordering of the set of list edit operations and independent of when the list edit operations in the set of list edit operations were created or received;

evaluating the set of list edit operations according to the evaluation order to generate the ordered list of components; and rendering one or more frames for display, based on the ordered list of components.

2. The method of claim 1, the method comprising:

associating a first portion of the set of list edit operations with a first portion of a digital production pipeline;

associating a second portion of the set of list edit operations with a second portion of a digital production pipeline, wherein the second portion of the digital production pipeline follows the first portion of the digital production pipeline;

wherein selecting at least a portion of the set of list edit operations includes selecting a first subset of the set of list edit operations associated with the first portion of the digital production pipeline and selecting a second subset of the set of list edit operations associated with the first and second portions of the digital production pipeline;

wherein determining at least one evaluation order of the set of list edit operations includes determining a first evaluation order for the first subset of the set of list edit operations and a second evaluation order for the second subset of the set of list edit operations; and wherein evaluating the set of list edit operations includes evaluating the first subset of list edit operations using the first evaluation order to specify a first ordered list associated with the first portion of the digital production pipeline and evaluating the second subset of list edit operations to specify a second ordered list associated with the first and second portions of the digital production pipeline.

3. The method of claim 1, wherein at least one of the list edit operations in the set of list edit operations comprises a unique list addition operation.

4. The method of claim 1, wherein at least one of the list edit operations in the set of list edit operations comprises a non-unique list addition operation.

5. The method of claim 1, wherein the set of list edit operations includes a list sorting operation specifying a relative arrangement of at least two components potentially included within the ordered list of components.

6. The method of claim 1, the method comprising:

following the evaluation of the set of list edit operations, receiving an additional list edit operation replacing at least one of the set of list edit operations to form a revised set of list edit operations;

determining a new evaluation order of the revised set of list edit operations, wherein the new evaluation order is independent of an ordering of the set of list edit operations and the additional list edit operation; and evaluating the revised set of list edit operations according to the new evaluation order to determine an second ordered list of components.

7. A method of generating an ordered list of components, the method comprising:

receiving a first layer including a first set of list edit operations;

receiving a second layer including a second set of list edit operations, wherein each of the first set of list edit operations and the second set of list edit operations contains a respective plurality of list edit operations, and wherein each list edit operation in the first set of list edit operations and the second set of list edit operations specifies a respective manipulation of the ordered list of components that includes at least one of (i) adding a component to the ordered list of components, (ii) removing one or more components in the ordered list of components, and (iii) re-ordering two or more of components in the ordered list of components;

receiving a layer stacking order specifying that the first layer is weaker than the second layer;

determining one or more intrinsic attributes of the set of list edit operations, wherein the one or more intrinsic attributes specify at least one of (i) a user identity, (ii) a user type, (iii) a user role, and (iv) a digital production pipeline activity, relating to at least one of the list edit operations in the set of list edit operations;

determining, by operation of one or more computer processors, an evaluation order of the first and second sets of list edit operations based on the layer stacking order and the determined one or more intrinsic attributes, wherein the evaluation order is independent of an ordering of the set of list edit operations and independent of when the list edit operations in the set of list edit operations were created or received;

evaluating the first and second sets of list edit operations according to the determined evaluation order to generate an ordered list of components; and rendering one or more frames for display, based on the ordered list of components.

8. The method of claim 7, wherein the evaluation order specifies that the first layer is weaker than the second layer, and wherein evaluating the first and second sets of list edit operations comprises:

evaluating the first set of list edit operations to determine an intermediate ordered list; and evaluating the second set of list edit operations on the intermediate ordered list to define the ordered list of components.

9. The method of claim 7, wherein the evaluation order specifies that the first and second sets of list edit operations are associated with the ordered list of components, and wherein evaluating the first and second sets of list edit operations comprises:

identifying a first portion of the first set of list edit operations having a first type;

identifying a first portion of the second set of list edit operations having the first type;

evaluating the first portion of the first set of list edit operations to determine a first intermediate ordered list;

evaluating the first portion of the second set of list edit operations on the first intermediate ordered list to determine a second intermediate ordered list;

identifying a second portion of the first set of list edit operations having a second type; and evaluating at least the second portion of the first set of list edit operations on the second intermediate ordered list to define the ordered list of components.

10. A method of generating an ordered list of components, the method comprising:

receiving a first intra-model dependency data structure including a first set of list edit operations;

receiving a second intra-model dependency data structure including a second set of list edit operations, wherein each of the first set of list edit operations and the second set of list edit operations contains a respective plurality of list edit operations, and wherein each list edit operation in the first set of list edit operations and the second set of list edit operations specifies a respective manipulation of the ordered list of components that includes at least one of (i) adding a component to the ordered list of components, (ii) removing one or more components in the ordered list of components, and (iii) re-ordering two or more of components in the ordered list of components;
receiving model dependency data specifying a relationship between the first and second intra-model dependency data structures;
determining one or more intrinsic attributes of the first and second sets of list edit operations, wherein the one or more intrinsic attributes specify at least one of (i) a user identity, (ii) a user type, (iii) a user role, and (iv) a digital production pipeline activity, relating to at least one of the list edit operations in the first and second sets of list edit operations;
determining, by operation of one or more computer processors, an evaluation order of the first and second sets of list edit operations based on the model dependency data and the determined one or more intrinsic attributes, wherein the evaluation order is independent of an ordering of the first and second sets of list edit operations and independent of when the list edit operations in the first and second sets of list edit operations were created or received;
evaluating the first and second sets of list edit operations according to the component dependency data to generate an ordered list of components; and
rendering one or more frames for display, based on the ordered list of components.

11. The method of claim 10, wherein the evaluation order specifies that the first intra-model dependency data structure is evaluated before the second intra-model dependency data structure, and wherein evaluating the first and second sets of list edit operations comprises:
evaluating the first set of list edit operations to determine an intermediate ordered list; and
evaluating the second set of list edit operations on the intermediate ordered list to define the ordered list of components.

12. The method of claim 10, wherein the evaluation order specifies that the first and second sets of list edit operations are associated with the ordered list of components, and wherein evaluating the first and second sets of list edit operations comprises:
identifying a first portion of the first set of list edit operations having a first type;
identifying a first portion of the second set of list edit operations having the first type;
evaluating the first portion of the first set of list edit operations to determine a first intermediate ordered list;
evaluating the first portion of the second set of list edit operations on the first intermediate ordered list to determine a second intermediate ordered list;
identifying a second portion of the first set of list edit operations having a second type; and
evaluating at least the second portion of the first set of list edit operations on the second intermediate ordered list to define the ordered list of components.

13. A method of specifying an ordered list of components, the method comprising:
receiving a first set of list edit operations specifying a first subset of the ordered list of components;
receiving a second set of list edit operations specifying a second subset of the ordered list of components,
wherein each of the first set of list edit operations and the second set of list edit operations contains a respective plurality of list edit operations, and wherein each list edit operation in the first set of list edit operations and the second set of list edit operations specifies a respective manipulation of the ordered list of components that includes at least one of (i) adding a component to the ordered list of components, (ii) removing one or more components in the ordered list of components, and (iii) re-ordering two or more of components in the ordered list of components;
determining, by operation of one or more computer processors, a first evaluation order of the first and second sets of list edit operations, wherein the first evaluation order is based on a determined one or more intrinsic attributes and a determined one or more extrinsic attributes of the first and second sets of list edit operations, wherein the one or more intrinsic attributes specify at least one of (i) a user identity, (ii) a user type, (iii) a user role, and (iv) a digital production pipeline activity, relating to at least one of the list edit operations in the first and second sets of list edit operations, and wherein the first evaluation order is independent of the order of receipt of each of the first and second sets of list edit operations;
evaluating the first and second sets of list edit operations according to the first evaluation order to specify a first ordered list including at least a first portion of the first subset of the ordered list of components and at least a first portion of the second subset of the ordered list of components;
receiving an additional list edit operation specifying a modified first subset of the ordered list of components and replacing at least a first portion of the first set of list edit operations, thereby forming a modified first set of list edit operations including the additional list edit operation;
determining, by operation of one or more computer processors, a second evaluation order of the modified first set and the second set of list edit operations, wherein the second evaluation order is independent of the order of receipt of each of the modified first set and the second set of list edit operations, wherein the second evaluation order is based on a determined one or more intrinsic attributes and a determined one or more extrinsic attributes of the modified first set and the second set of list edit operations;
evaluating the modified first set of list edit operations and the second set of list edit operations according to the second evaluation order to generate a second ordered list of components including at least a first portion of the modified first subset of the ordered list of components and at least the first portion of the second subset of the ordered list of components; and
rendering one or more frames for display, based on the second ordered list of components.

14. The method of claim 13, wherein the second evaluation order specifies that the additional list edit operation is to be evaluated before at least a first portion of the second set of list edit operations.

15. The method of claim 14, wherein the first evaluation order specifies that the first portion of the first set of list edit operations is to be evaluated before the first portion of the second set of list edit operations.

16. The method of claim 15, wherein evaluating the modified first set of list edit operations and the second set of list edit operations comprises:

replacing the first portion of the first set of list edit operations with the additional list edit operation in the first evaluation order to create the second evaluation order.

17. The method of claim 13, wherein at least a first portion of the second set of list edit operations is adapted to override a second portion of the first subset of the ordered list, such that the first ordered list does not include the second portion of the first subset of the ordered list and the second ordered list does not include a corresponding second portion of the modified first subset of the ordered list.

* * * * *